3,080,930
FRONT MOUNTED CULTIVATOR
James Morkoski, Clarendon Hills, Charles Boetto and Jack L. Bauman, Naperville, and Lawrence D. Westerfield, Plainfield, Ill., assignors to International Harvester Company, Chicago, Ill., a corporation of New Jersey
Filed June 21, 1960, Ser. No. 37,751
12 Claims. (Cl. 172—298)

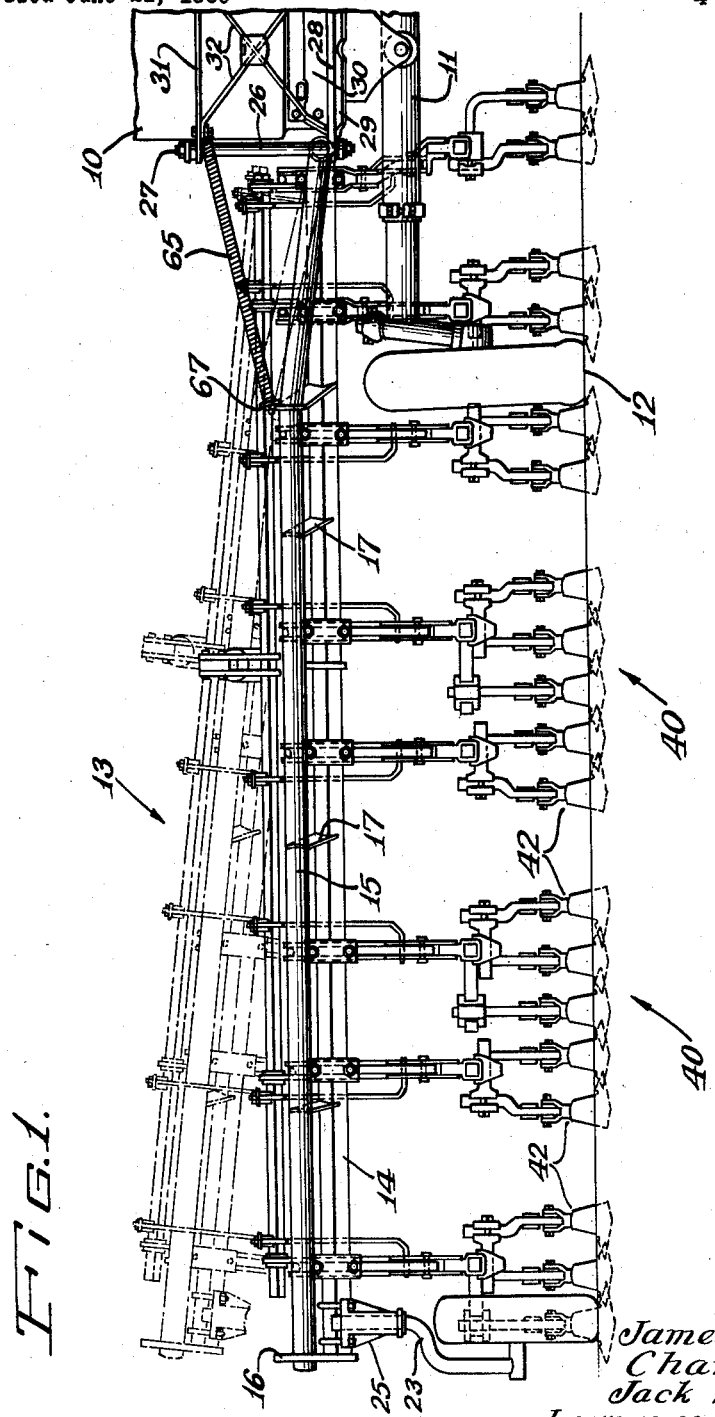

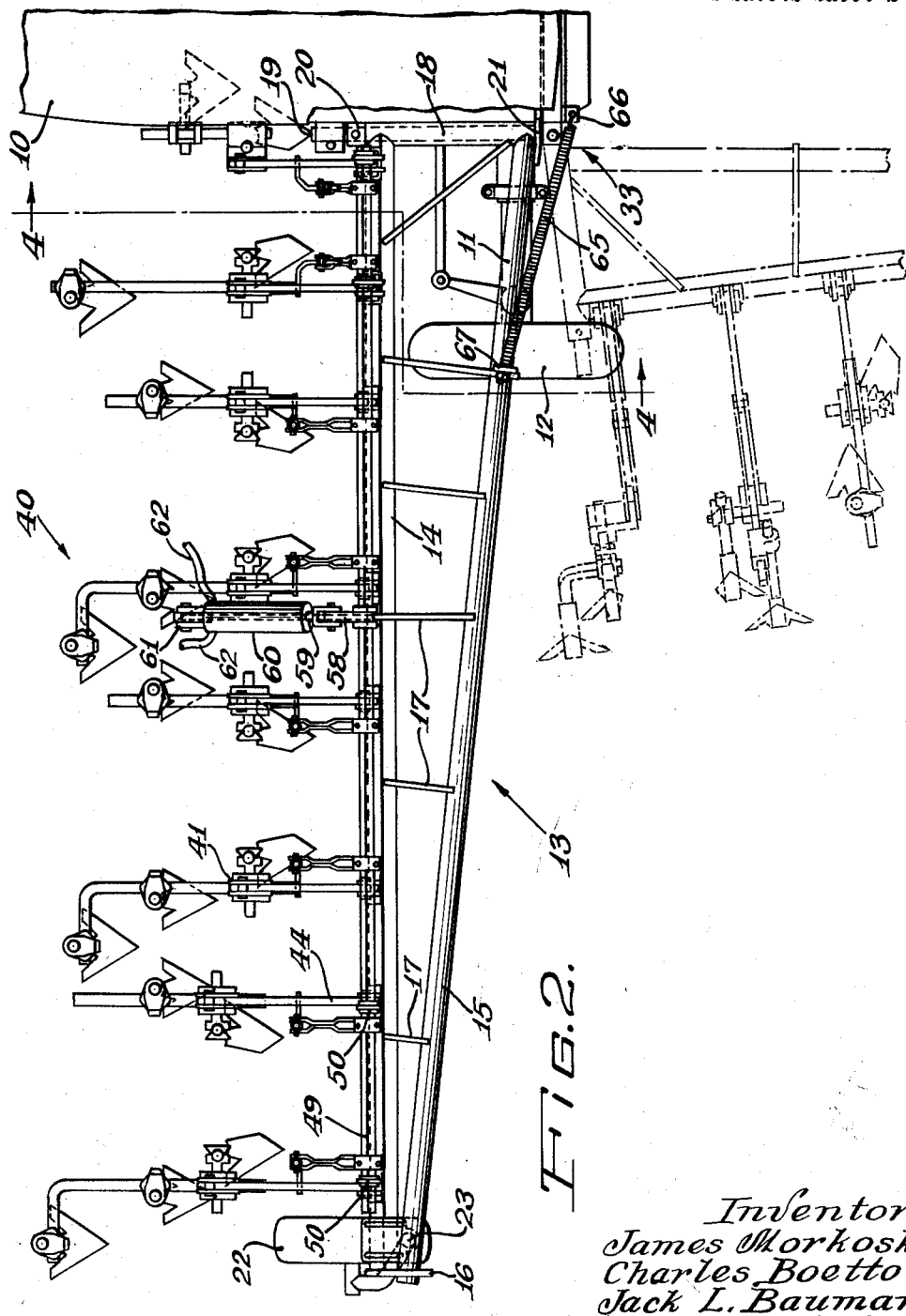

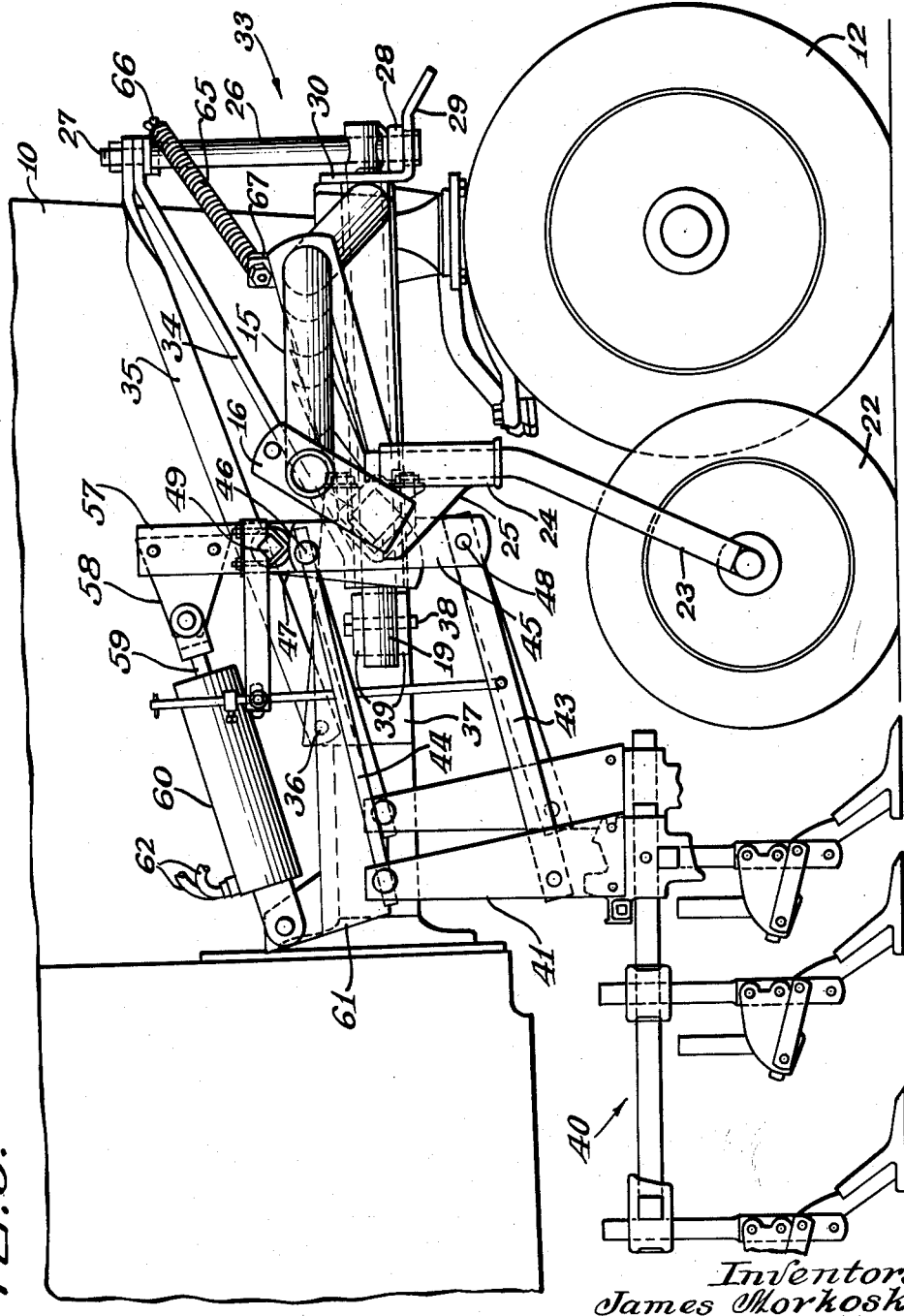

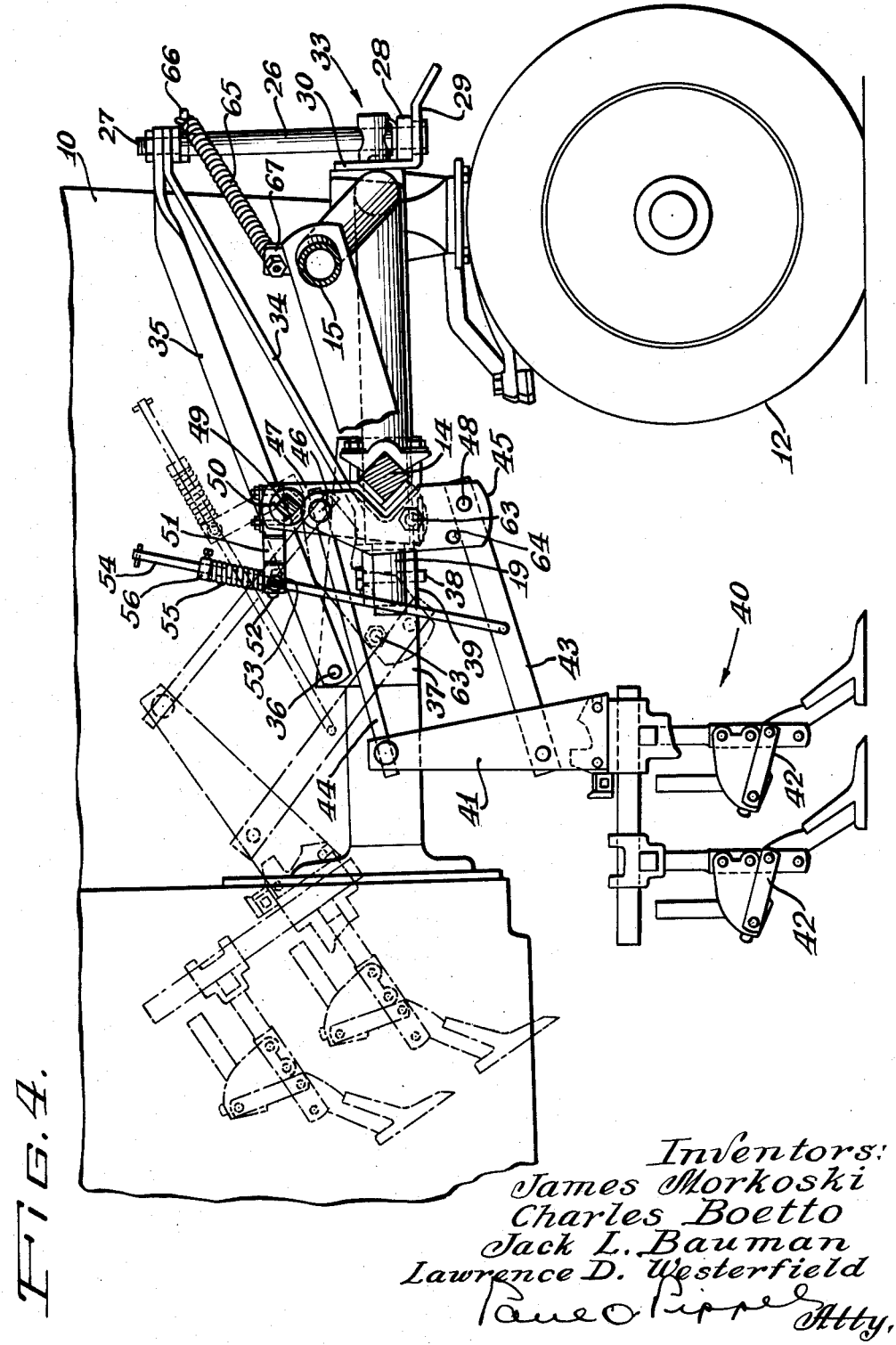

This invention relates to agricultural implements and particularly to implements of the direct connected or tractor mounted type. More specifically, the invention concerns multi-row tractor mounted cultivators and the like.

Row crop cultivating and like implements are usually mounted on the front of the tractor by tool bar supports which are secured to the tractor and extend laterally outwardly from opposite sides thereof. Relatively small cultivators, planters and the like can be attached and detached by a tractor operator without too much trouble, but with the modern trend toward mechanization, these implements have become larger and larger to cover a wider area under tillage, creating problems for the farmer in attaching and detaching the implement. One well-known method of solving this problem has been the hinging of the tool frames to the tractor so that they can be swung away from the tractor to allow the latter to be driven into and away from the implement and thus eliminate the need for lifting the heavy implement sections to attach them to and remove them from the tractor.

Transportation of the implement has remained an important factor in limiting the size thereof because, although the earth working elements could be lifted out of the ground, the width of the supporting frames made it impossible to pass through gates and impractical to travel the highways. An object of the invention is, therefore, the provision of an improved tractor mounted cultivator or the like of novel construction wherein the above mentioned problems are solved efficiently and economically.

Another object of the invention is the provision of an improved tractor mounted multi-row implement wherein novel means are provided for hinging the implement to the tractor body whereby the tool-carrying frames at each side of the tractor body can be swung away from and toward the tractor so that the tractor can be driven into and between the two sections of the implement for easy attachment, and can be backed away from the implement sections without damage thereto while facilitating detachment.

Another object of the invention is the provision of an improved tractor mounted multi-row cultivator or the like wherein the laterally extending tool-carrying sections are hinged to the front of the tractor for swinging in a horizontal plane over the front wheels and to a location ahead of the tractor and in general alinement therewith to substantially reduce the width of the implement and facilitate transport thereof through gates and on highways.

Another object of the invention is the provision of an improved tractor mounted multi-row cultivator or the like wherein the laterally extending tool-carrying sections, in addition to being hinged to the tractor on a vertical axis for horizontal swinging, are also hinged to the tractor body for vertical floating, each independently of the other, to accommodate the implement to variations in ground contour, and are supported at the outer ends by gauge wheels.

A further object of the invention is the provision of an improved tractor mounted cultivator wherein the laterally extending tool-carrying frames are hinged to the front of the tractor for swinging to a position ahead of and in alinement with the tractor body for transport, and wherein the earth working tools are raised and lowered relative to the tool frames and held in this position throughout the range of horizontal swinging of the tool frames.

Another object of the invention is the provision of an improved tractor mounted cultivator of the hinge or drive-in type wherein the laterally extending implement sections are mounted on the tractor by means also accommodating independent vertical floating of the said sections, and wherein means are provided for relieving the implement sections of some of their weight and transferring it to the tractor to improve the traction thereof and facilitate the steering and control of the implement sections.

Another object of the invention is the provision of an improved tractor mounted hinged cultivator adapted for mounting upon a tractor of the wide front axle type, wherein means are provided for elevating the innermost tool gangs higher than the outer gangs to permit the innermost gangs to clear the adjacent front wheel of the tractor when the implement section is swung horizontally to its transport position or to a position to facilitate detaching the implement from the tractor and backing the tractor therefrom.

Other objects and advantages of the invention will become clear from the following detailed description when read in conjunction with the accompanying drawings wherein:

FIGURE 1 is a view in front elevation of one section of an eight row front mounted cultivator embodying the features of this invention mounted upon a tractor of the wide front axle or four-wheel type, dotted lines indicating the floating of the implement section and the position the sections may assume relative to the tractor in response to changes in ground contour;

FIGURE 2 is a plan view of the structure shown in FIGURE 1 indicating in dotted lines the forwardly swung transport position of the right-hand implement section illustrated;

FIGURE 3 is a view in side elevation, on an enlarged scale, of the implement section shown in FIGURES 1 and 2;

FIGURE 4 is a section taken on the line 4—4 of FIGURE 2 and illustrating in dotted lines the elevated position of the innermost gangs to facilitate its clearing the front wheel of the tractor when the implement section is swung forwardly about its vertical pivot to its transport position ahead of and in alignment with the tractor body.

The implement described herein is applicable to and may be mounted upon tractors of conventional construction of either the four-wheel or the tricycle type, but is illustrated as applied to a four-wheel tractor, only a portion of which is shown in the drawings, but which it may be understood has steerable wheels at the front and drive wheels at the rear. As shown in the drawings, the tractor has a longitudinally extending body 10, a transverse wheel support 11 and laterally spaced front wheels 12, only one of which is shown. The implement with which this invention is concerned is an eight-row cultivator consisting of a pair of laterally spaced tool-carrying frames or sections 13 mounted on and extending laterally from opposite sides of the tractor body at the forward end thereof. The tool sections are substantial duplicates, only one being shown, and the description of one will suffice for both.

Frame section 13 comprises an elongated tool bar 14, square in cross-section, extending laterally from the side of the tractor body near the forward end thereof and a pipe section frame member 15 secured at its outer end to a plate 16 affixed to the end of tool bar 14. Frame member 15 extends diagonally forwardly in general triangular relationship with the bar 14, and is connected to the latter by a plurality of braces 17.

The inner ends of the frame members 14 and 15 are affixed to a bearing or sleeve member 18 which, as shown in FIGURE 2, extends alongside and parallel to the forward end of the tractor body and is rotatable to permit vertical movement of section 13 relative to the tractor about the axis of a pivot member in the form of a shaft 19, and is held thereon by a removable collar 20 at its rear end and engageable with a stop 21 secured to the shaft near its forward end. The outer end of the tool section is supported by a ground engaging member in the form of a gauge wheel 22, mounted upon the lower end of an axle 23, the upper end of which is rotatably carried in a bearing 24 affixed to a bracket 25 clamped to the outer end of the bar 14.

The forward end of pivot member 19 extending beyond stop 21 is affixed to a vertical bearing or sleeve 26 rotatably mounted upon a spindle 27, the lower end of which is secured to a plate 28, which extends transversely across the front of the tractor and rests upon the horizontal flange 29 of an angle bracket 30 secured to the front end of the tractor. It may be understood that another spindle 27, not shown, is secured to the other end of plate 28 at the opposite side of the tractor to provide a vertical pivot for the tool supporting frame corresponding to frame 13 and extending laterally from the opposite side of the tractor. The spindles are further connected by an upper brace 31 and cross-braces 32. It will thus be seen that a pivot means is provided and designated generally by the numeral 33, which includes both a horizontal pivot about the axis of shaft member 19 and a vertical pivot about the spindle 27 to accommodate not only vertical floating movement of the frame section 13 relative to the tractor but a horizontal swinging movement as well for a purpose hereinafter to be set forth.

The upper end of spindle 27 is connected by a bracing bar 34 with the bearing or sleeve member 18, and another bracing bar 35 is connected at its forward end to the upper end of spindle 27 and is anchored at its rear end to a pin 36 carried by a plate 37 affixed to the side of the tractor body. In the tractor attached position of the tool frame, as shown in FIGURE 3, the rear end of shaft 19 is anchored alongside the tractor body by a pin 38 passed through alined openings in shaft 19 and a pair of lugs 39 between which the shaft is received and which are affixed to the plate 37.

The implement shown in the drawings is a cultivator, and the tool frame 13 supports a plurality of laterally spaced cultivator gangs 40, although it should be understood that the tool frame may also support other types of earth working tools such as planter units and the like. Each of the cultivator gangs 40 includes a standard 41 to the lower end of which is secured a plurality of earth working tools 42 of conventional form.

A pair of vertically spaced parallel links 43 and 44 is pivotally connected at their rear ends at vertically spaced locations to the standard 41 and their forward ends are pivotally connected at vertically spaced locations to a bracket 45, comprising a pair of plates in the upper ends of which is mounted a pivot pin 46, as shown in FIGURE 3, carried by an upright 47, the lower end of which is affixed to tool bar 14. The lower end of bracket 45 carries a pivot pin 48 for the lower parallel link 43. It should thus be clear that each of the tool gangs is mounted on the tool bar 14 for vertical swinging with the parallel links 43 and 44 between a ground-engaging or operating and a raised or transport position. Vertical movement of the tool gangs with respect to the tractor is accomplished by the provision of a transversely extending rock shaft 49 square in cross-section, parallel to tool bar 14 and rockably mounted in bearings 50 carried by uprights 47. A plurality of rock arms 51, one for each disk gang, is provided and secured to the rock shaft 49 at laterally spaced locations thereon and extend rearwardly therefrom.

Each of the arms 51 is bifurcated at its end to receive a swivel 52 pivotally mounted on trunnions 53 and apertured to slidably receive a lift rod 54, the lower end of which is pivotally connected to the lower link 43. A coil spring 55 surrounds rod 54 and engages at its lower end the swivel 52 and at its upper end a collar 56. Rocking of arms 55 in a clockwise direction as viewed in FIGURES 3 and 4 will raise the tool gangs from the ground to a transport position. Rocking of the shaft 49 to raise and lower the earth working tools is accomplished by the provision of an arm 57 secured to shaft 49 and having a rearward extension 58 connected to a piston rod 59 slidable in a hydraulic cylinder 60 (see FIG. 3) anchored to a bracket 61 secured to and extending rearwardly from the tool bar 14. Fluid under pressure to actuate the cylinder and piston unit to rock shaft 49 and raise and lower the tool gangs is supplied by flexible tubes 62 extending between the implement and the tractor and connected to a source of fluid under pressure, not shown, on the tractor, and of any well-known construction.

For transporting the implement over the highways and to facilitate passage thereof through gates and the like, the hinging of the tool frame on the hinge member or spindle 27 is utilized to swing each tool section on opposite sides of the tractor substantially 90 degrees forwardly to a position such as shown in dotted lines in FIGURES 1, 2 and 4 travel an arc which will nor- FIGURE 2. Since the innermost tool gangs 40 shown mally bring the earth working tools into contact with the adjacent tractor front wheel, special provision is made to avoid such contact. In FIGURE 4 the dotted line position shows the innermost tool gang elevated much higher than the remainder of the tool gang.

Inasmuch as when in operating position the innermost gang is below the body of the tractor, when the implement is to be swung forwardly to the transport position shown in dotted lines in FIGURE 2, and the individual tool gangs are to be elevated to their non-operating position, the pin 38 is removed and the tool gangs elevated sufficiently above the ground that the shaft 19 and the associated tool frame can be swung away from the body of the tractor.

Referring particularly to FIGURE 4, it will be observed that the bracket 45 supporting the forward ends of the parallel links 43 and 44 for the innermost gang is shaped somewhat differently from the other similar brackets and is secured to the lower portion of upright 47 by a bolt 63. Upon removal of bolt 63, bracket 45 is connected to the upright 47 only by the pivot bolt 46 and is capable of swinging about the axis of the pin 46 to the dotted line position of FIGURE 4. Bolt 63 is removed and placed in another opening 64 provided in bracket 45 which is adjacent the upper edge of the lower link 43 when the earth-working tools are in a lowered position. By placing the bolt 63 in the opening 64 as shown in the dotted line position of FIGURE 4, the upward swinging of the links 43 and 44 relative to the bracket 45 is limited and clockwise rocking of the arm 51 on shaft 49 causes the entire tool gang including the bracket 45 to swing upwardly about the axis of the pin 46, considerably increasing the elevation of the innermost gang so that, upon swinging the tool section 13 forwardly about the hinge axis 27 the earth-working tools clear the associated tractor wheel.

The tool frames 13 on opposite side of the tractor cover a wide area of ground and when variations in ground contour are encountered, the hinge connection of the tool section to the tractor on the axis of shaft 19 permits each tool section to float independently vertically relative to the tractor and to assume positions such as shown in dotted lines in FIGURE 1.

Likewise a multi-row implement such as the eight-row cultivator shown herein presents problems in steering which are ameliorated and steering improved by relieving the tool sections of some of their weight and transferring it to the tractor to increase the traction on the front wheels. This transfer of weight from the implement to the tractor is accomplished by the provision of a coil spring 65 anchored at one end to a lug 66 affixed to sleeve 26, and at its other end to a lug 67 affixed to pipe 15.

Once the implement is swung forwardly to the transporting position shown in dotted lines in FIGURE 2, the tractor is backed away until plate 28 slides off the downwardly bent forward end of flange 29, and the frame is supported by the provision of suitable stands of conventional construction (not shown) attached to the end of the tool frame opposite the gauge wheels 22. The swinging of the tool section forwardly to transport position and the steering of the implement in operation are facilitated by the castering of the gauge wheel permitted by the rotation of the upper end of axle 23 in bearing 24.

To reattach the implement after it has been removed the tractor is simply driven up to the plate 28 between the sections, the plate riding upwardly over the flange 29 into position, whereupon the tool sections are swung rearwardly alongside the tractor until the rear end of shaft 19 is received between the lugs 39 and the pin 38 inserted to hold it in position. Brace 35 is reattached and the implement is ready for operation.

It is believed that the operation of the novel multirow implement of this invention will be clearly understood from the foregoing description. It should likewise be understood that the invention has been described in its preferred embodiment only, and that modifications may be made in the invention without departing from the spirit thereof or the scope of the appended claims.

What is claimed is:

1. An implement adapted to be mounted on a tractor having a body and front and rear wheels, comprising an elongated tool-carrying frame extending laterally outwardly from the side of the tractor body in advance of the rear wheels, pivot means operatively connecting the inner end of said frame to the tractor for independent vertical floating movement relative to the tractor during operation thereof, earthworking tools mounted on said tool-carrying frame for vertical movement between operating and raised positions, power operated means associated with the tool-carrying frame and operatively connected to said earthworking tools for raising and lowering the latter relative to the frame, and pivot means connecting the inner end of said frame to the tractor for horizontal swinging of said tool-carrying frame from an operating position extending laterally from the side of the tractor to a transport position forwardly of and generally parallel to the path of travel of the tractor.

2. An implement adapted to be mounted on a tractor having a body and front and rear wheels, comprising an elongated tool-carrying frame extending laterally outwardly from the side of the tractor body in advance of the rear wheels, pivot means operatively connecting the inner end of said frame to the tractor for independent vertical floating movement relative to the tractor during operation thereof, and pivot means connecting the inner end of said frame to the tractor for horizontal swinging of said tool-carrying frame from an operating position extending laterally from the side of the tractor to a transport position forwardly of and generally parallel to the path of travel of the tractor, earthworking tools mounted on said tool-carrying frame for vertical movement between operating and raised positions, power operated means associated with the tool-carrying frame and operatively connected to said earthworking tools for raising and lowering the latter relative to the frame, and a ground-engaging wheel mounted on and supporting the outer end of said tool-carrying frame in both operating and transport positions thereof.

3. An implement adapted to be mounted on a tractor having a body and front and rear wheels, comprising an elongated tool-carrying frame extending laterally outwardly from the side of the tractor body in advance of the rear wheels, pivot means connecting the inner end of said frame to the tractor for independent vertical floating movement relative to the tractor during operation thereof, and pivot means connecting the inner end of said frame to the tractor for horizontal swinging of said tool-carrying frame from an operating position extending laterally from the side of the tractor to a transport position forwardly of and generally parallel to the path of travel of the tractor, a ground-engaging castering wheel mounted on and supporting the outer end of said tool-carrying frame in both operating and transport positions thereof, and a tension spring operatively connected to the tractor and to said tool-carrying frame arranged to relieve said wheels of some of the weight of said tool-carrying frame and transfer it to the tractor.

4. The invention set forth in claim 2, wherein said wheels are adapted to caster to facilitate the propelling of the implement and the horizontal swinging of the tool-carrying frame between operating and transport positions.

5. An implement adapted to be mounted on a tractor having a body and front and rear wheels, comprising an elongated tool-carrying frame extending laterally outwardly from the side of the tractor body in advance of the rear wheels and positioned substantially perpendicularly to the direction of travel of said tractor, a ground-engaging wheel supporting the outer end of said frame, pivot means operatively connecting the inner end of said frame to the forward end of the tractor for swinging in a horizontal plane substantially 90 degrees to a position forwardly of the tractor body generally parallel to the direction of travel thereof to reduce the width of the implement and facilitate transportation thereof, earth working tools mounted on said frame for vertical movement between ground-engaging and raised positions, a hydraulic cylinder mounted on and swingable with each said frame and operatively connected to said tools for raising and lowering the latter, and power transmission means extending between the tractor and said cylinders and effective throughout the range of horizontal swinging of said tool frame and cylinders to actuate the cylinders to raise and lower the tools.

6. An implement adapted to be mounted on a tractor having a longitudinally extending body and front and rear wheels comprising an elongated tool frame extending laterally from the side of the tractor body, a sleeve member affixed to the inner end of said tool frame, an elongated shaft member pivotally receivable in said sleeve member to accommodate vertical floating movement of the tool frame relative to the shaft member, and means pivotally connecting one end of said shaft member to the tractor body for swinging in a horizontal plane from a position alongside and parallel to the tractor body to a position generally perpendicular thereto.

7. An implement adapted to be mounted on a tractor having a longitudinally extending body and front and rear wheels comprising an elongated tool frame extending laterally from the side of the tractor body, a sleeve member affixed to the inner end of said tool frame, an elongated shaft member pivotally receivable in said sleeve member to accommodate vertical floating movement of the tool frame relative to the shaft member, means pivotally connecting one end of said shaft member to the tractor body for swinging in a horizontal plane from a position alongside and parallel to the tractor body to a position generally perpendicular thereto, and a ground-engaging caster wheel mounted on and supporting the outer end of said frame and swingable horizontally therewith.

8. An implement adapted to be mounted on a tractor having a longitudinally extending body and laterally spaced front and rear wheels, comprising an elongated tool frame extending laterally from the side of the tractor body between said front and rear wheels, means pivotally connecting the inner end of said frame to the forward end of the tractor body for swinging in a horizontal plane above and to a location forwardly of one of said front wheels, a plurality of earth-working tools mounted on said tool frame at laterally spaced locations for vertical movement relative thereto, means carried by the tractor and operatively connected to said earthworking tools for lifting them to a raised position, one of said earth-working tools being swingable with the tool frame on an arc intersected by and engageable with one of said front wheels, and additional means in the connection of said one of said tools to the tool frame and optionally operable upon actuation of said lifting means to impart additional lift to said one of said tools to clear said wheel.

9. An implement adapted to be mounted on a tractor having a longitudinally extending body and laterally spaced front and rear wheels, comprising an elongated tool frame extending laterally from the side of the tractor body between said front and rear wheels, means pivotally connecting the inner end of said frame to the forward end of the tractor body for swinging in a horizontal plane above and to a location forwardly of one of said front wheels, a plurality of earth-working tools connected at laterally spaced locations to the tool frame, the innermost of said earth-working tools being swingable with the tool frame on an arc intersected by and engageable with one of said front wheels, the means connecting said innermost tool to the frame comprising a pair of vertically spaced generally parallel links pivotally connected at their rear ends to the tool, and pivotal means connecting the forward ends of the links to the frame including a bracket to which the forward ends of the links are connected for vertical movement relative thereto between lowered and raised positions, said bracket being optionally releasable from the frame to accommodate swinging of the bracket with the links about the connection of one of the links to the frame, and means for locking the links against pivoting in one direction relative to the bracket.

10. An implement adapted to be mounted on a tractor having a longitudinally extending body and laterally spaced front and rear wheels, comprising an elongated tool frame extending laterally from the side of the tractor body between said front and rear wheels, means pivotally connecting the inner end of said frame to the forward end of the tractor body for swinging in a horizontal plane above and to a location forwardly of one of said front wheels, a plurality of earth-working tools connected at laterally spaced locations to the tool frame, the innermost of said earth-working tools being swingable with the tool frame on an arc intersected by and engageable with one of said front wheels, the means connecting said innermost tool to the frame comprising a pair of vertically spaced generally parallel links pivotally connected at their rear ends to the tool, and pivotal means connecting the forward ends of the links to the frame for vertical movement relative thereto between lowered and raised positions, and optionally operable means for releasing the connection of one of said links to the frame to accommodate vertical swinging of both links and said tool about the pivotal connection of one of the links to the support.

11. The invention set forth in claim 10, wherein a bracket is provided to which the links are connected by the same means which connects the bracket to the frame, one of the connections of the bracket to the frame being optionally releasable to accommodate swinging of the bracket with the links about the connection of one of the links to the frame.

12. An implement adapted to be mounted on a tractor having a longitudinally extending body and laterally spaced front and rear wheels, comprising an elongated tool frame extending laterally from the side of the tractor body between said front and rear wheels, means pivotally connecting the inner end of said frame to the forward end of the tractor body for swinging in a horizontal plane above and to a location forwardly of one of said front wheels, a plurality of laterally spaced link means pivotally connected at one end to said tool frame for independent swinging relative thereto in a vertical plane, earthworking tools mounted on each of said link means for swinging therewith between lowered and raised positions, one of said earthworking tools being movable with the tool frame on an arc intersected by and engageable with one of said front wheels, means deriving power from the tractor and operatively connected to said link means to swing the earth-working tools simultaneously from a lowered to a raised position, and additional means in the connection of said one of said link means to the tool frame and optionally operable, upon actuation of said means deriving power from the tractor, to impart additional lift to said one of said link means to cause the earthworking tools carried thereby to be elevated to a greater height than the others of said earthworking tools to clear said wheel.

References Cited in the file of this patent

UNITED STATES PATENTS

| 1,962,349 | Johnson | June 12, 1934 |
| 2,660,939 | Pool et al. | Dec. 1, 1953 |
| 2,737,868 | Morkoski | Mar. 13, 1956 |
| 2,961,054 | Green | Nov. 22, 1960 |

FOREIGN PATENTS

| 200,378 | Austria | Oct. 25, 1958 |
| 1,068,182 | France | June 23, 1954 |
| 1,158,656 | France | Jan. 27, 1958 |